Figure 1:
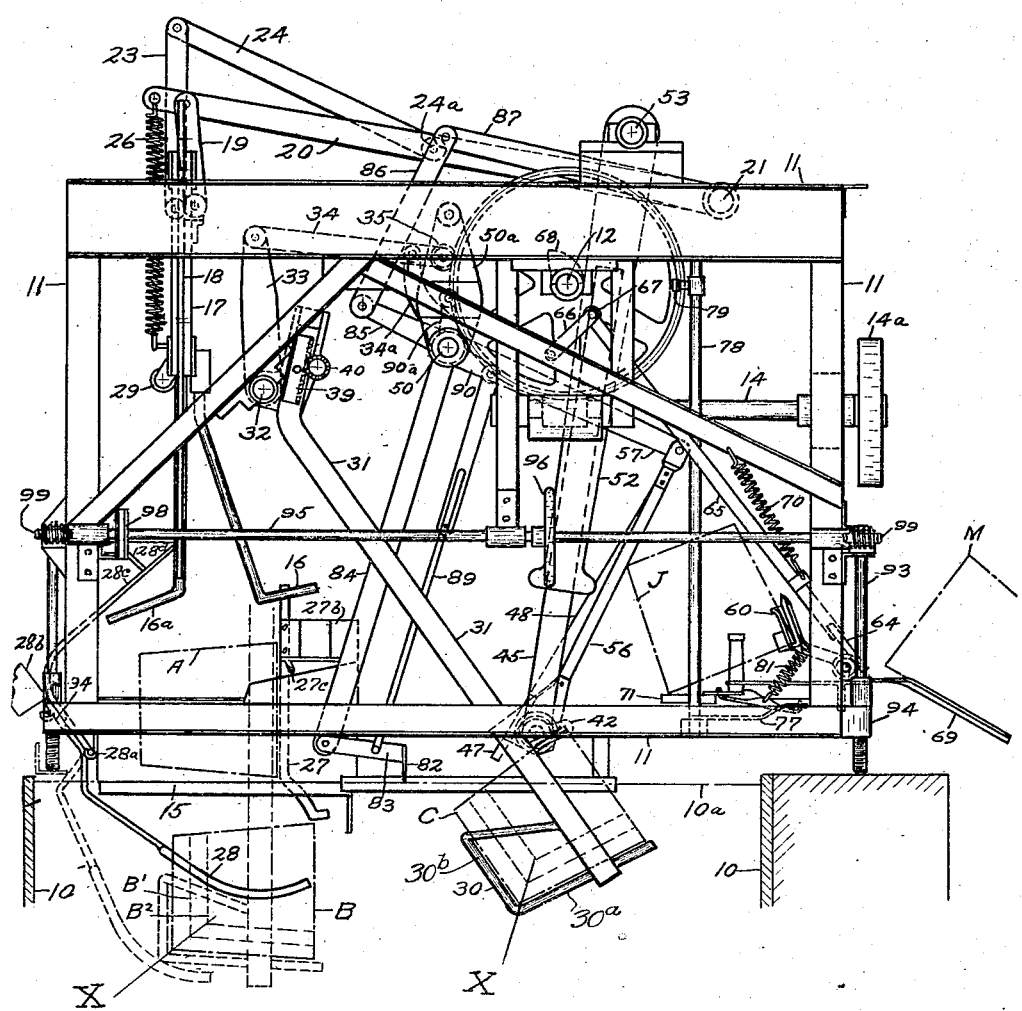

May 15, 1928.

A. R. CURTIS 1,669,975

METAL COATING MACHINE

Filed Dec. 26, 1922

10 Sheets-Sheet 1

Inventor
Arthur R. Curtis
by Attorneys
Thurston Kwis & Hudson

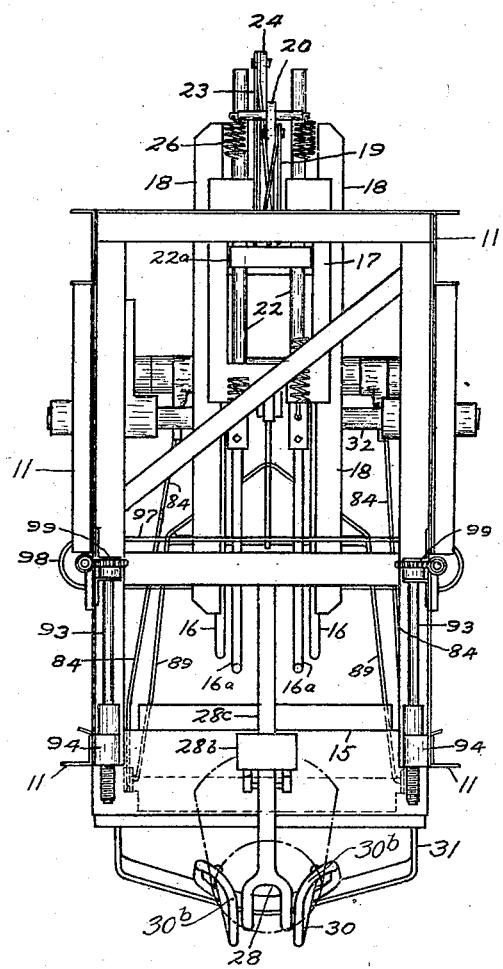

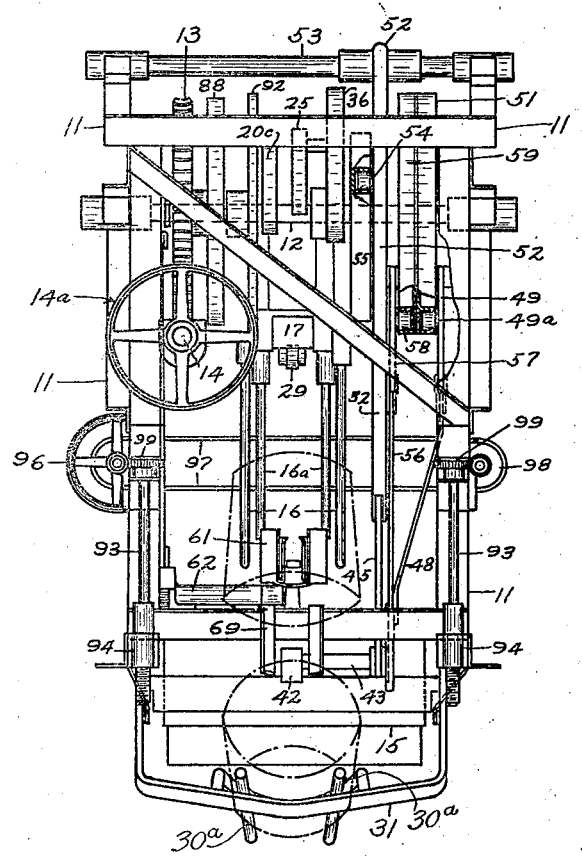

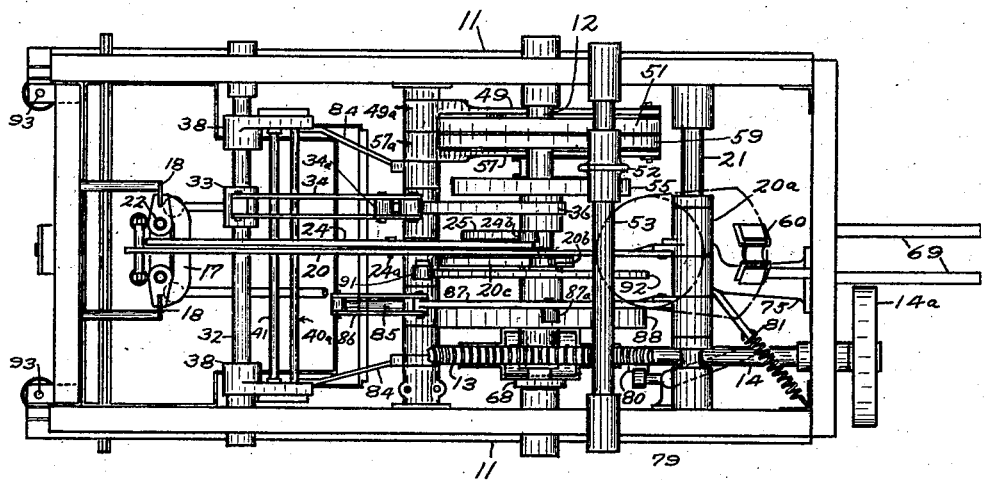

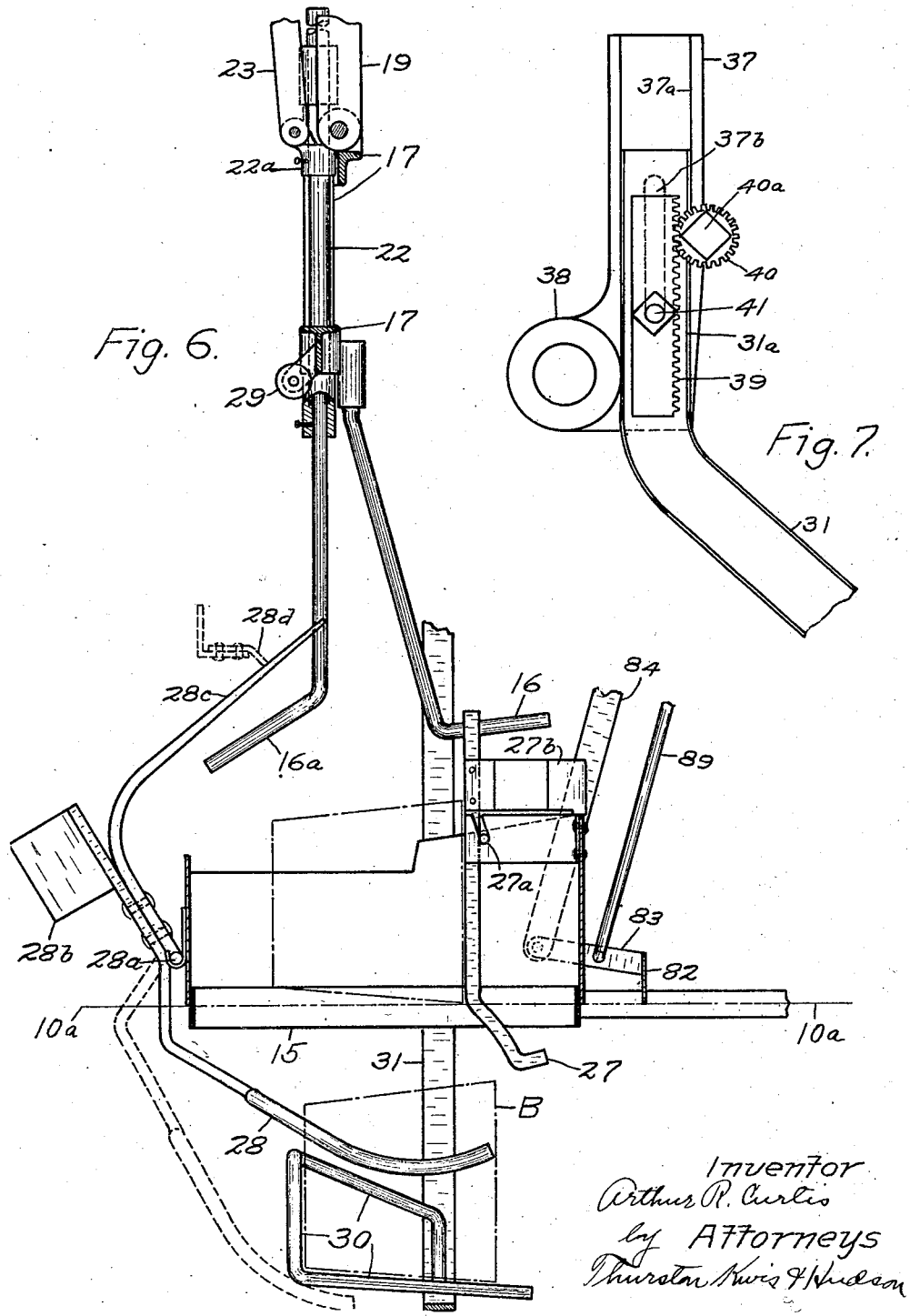

May 15, 1928.  
A. R. CURTIS  
METAL COATING MACHINE  
Filed Dec. 26, 1922 10 Sheets-Sheet 6

1,669,975

Inventor
Arthur R. Curtis
by Attorneys
Thurston Kwis & Hudson

May 15, 1928. 1,669,975
A. R. CURTIS
METAL COATING MACHINE
Filed Dec. 26, 1922 10 Sheets-Sheet 7
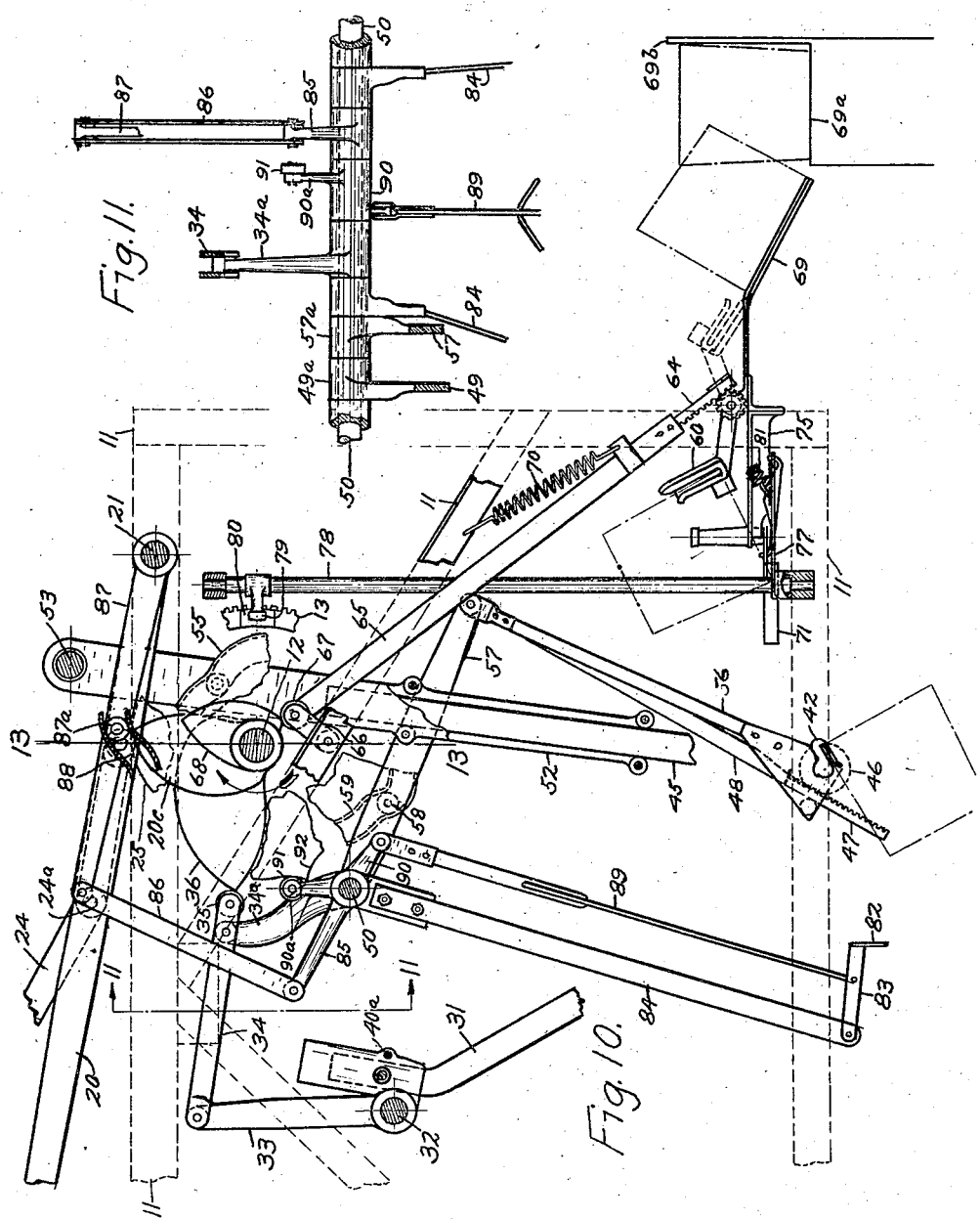
Inventor
Arthur R. Curtis
by Attorneys

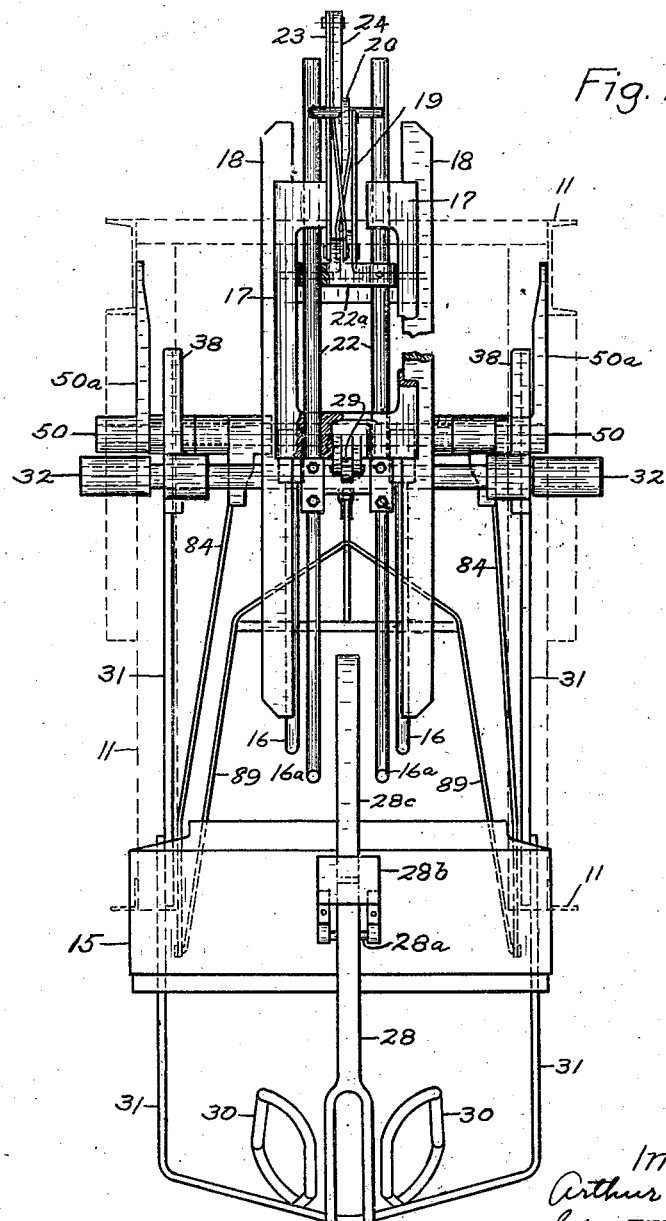

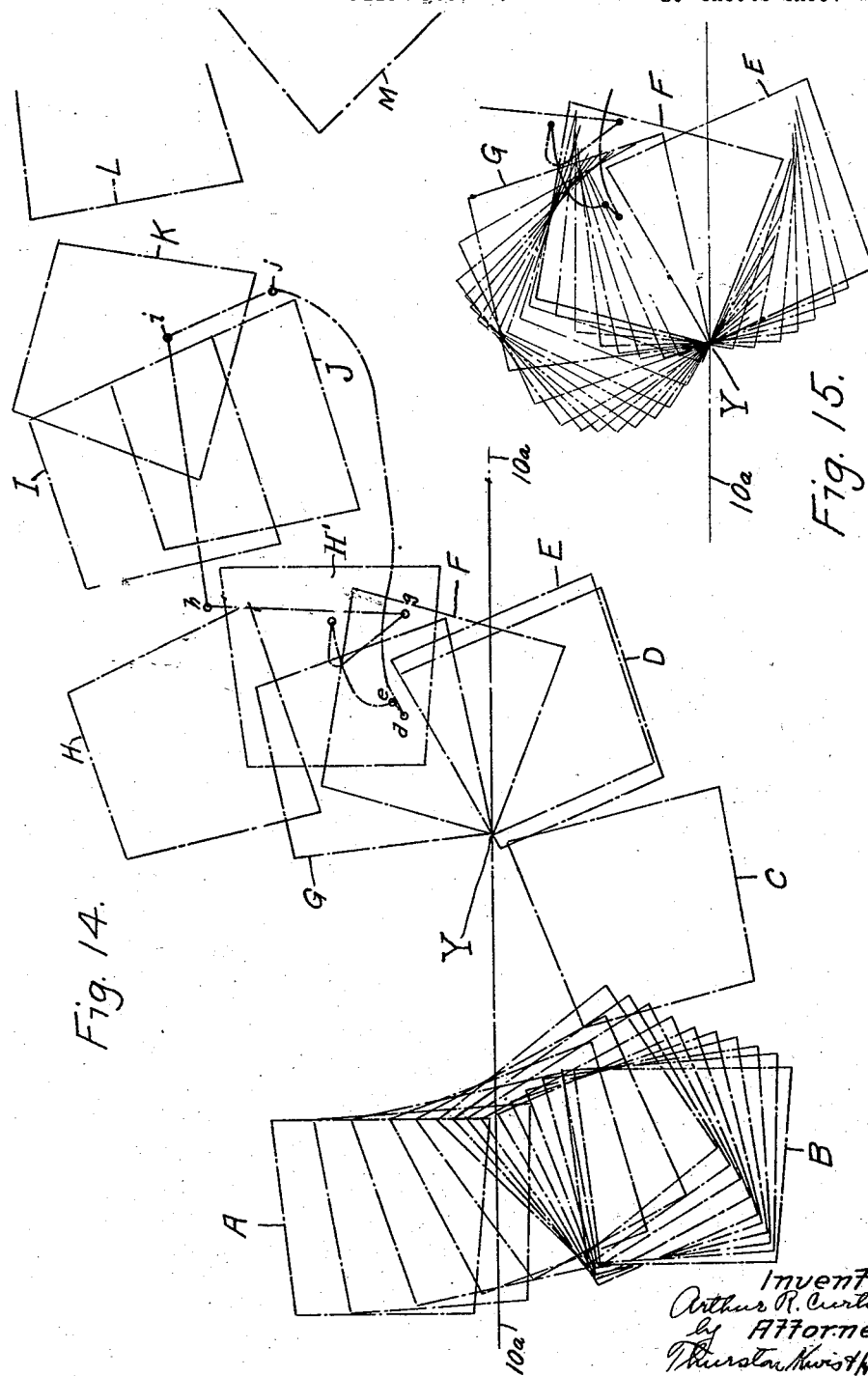

Patented May 15, 1928.

1,669,975

UNITED STATES PATENT OFFICE.

ARTHUR R. CURTIS, OF CLEVELAND, OHIO, ASSIGNOR TO CLARENCE J. HAYS, OF CLEVELAND, OHIO.

METAL-COATING MACHINE.

Application filed December 26, 1922. Serial No. 608,832.

This invention relates to a galvanizing or metal coating machine and is an improvement on the machine shown in Patent No. 1,383,555, granted July 5, 1921, jointly in the names of Joseph Monto and myself. This machine, like that shown in the Monto and Curtis patent is adapted particularly for galvanizing pails, but it may be used also for galvanizing other vessels or articles, but in the following description the article being galvanized will for convenience be referred to as a "pail," but it will be understood that the word "pail" is not used in a limiting sense nor as indicating that other articles may not be handled in the machine.

The principal object of the present invention is to provide certain improvements wherein more satisfactory galvanizing may be done. More particularly the invention aims to improve the galvanized product by insuring a thin, uniform coat and to eliminate bare spots and rough spots which at times, at least, occurred heretofore.

Still further the invention aims to avoid excess thickness or amount of metal at any point, and to provide a smooth edge at the top of the pail.

A still further object is to provide a machine having large capacity, i. e. wherein the articles may be galvanized in a very satisfactory manner as well as with rapidity. Additionally it is one of the objects to provide a machine constructed for durability, and wherein the parts are not liable to impairment by wear or heat from the liquid metal.

The above objects are attained by improvements which I have made in all the essential elements of the machine, these improvements relating to the submerging device; to the transfer device which moves or transfers the pails to the drawing device; to the drawing device or mechanism which draws the pail out of the metal; to the draining, striking and discharge mechanism which receives the pail from the drawing device, causes it to drain in the proper manner and to be freed of excess metal, which clears the drainage edge of dripping metal and finally delivers the pail out of the machine; to the skimming mechanism which skims the surface of the metal just before the pail is drawn therethrough; and to the so-called lowering device by which the skimmer is caused to work at the proper depth in the liquid metal.

The various improvements which I have made in the parts of the machine above referred to will be explained in detail in the following description, and the invention may at this point be briefly summarized as consisting in certain novel details of construction and combinations and arrangements of parts which will be described in the specification and set forth in the appended claims.

Figure 8:
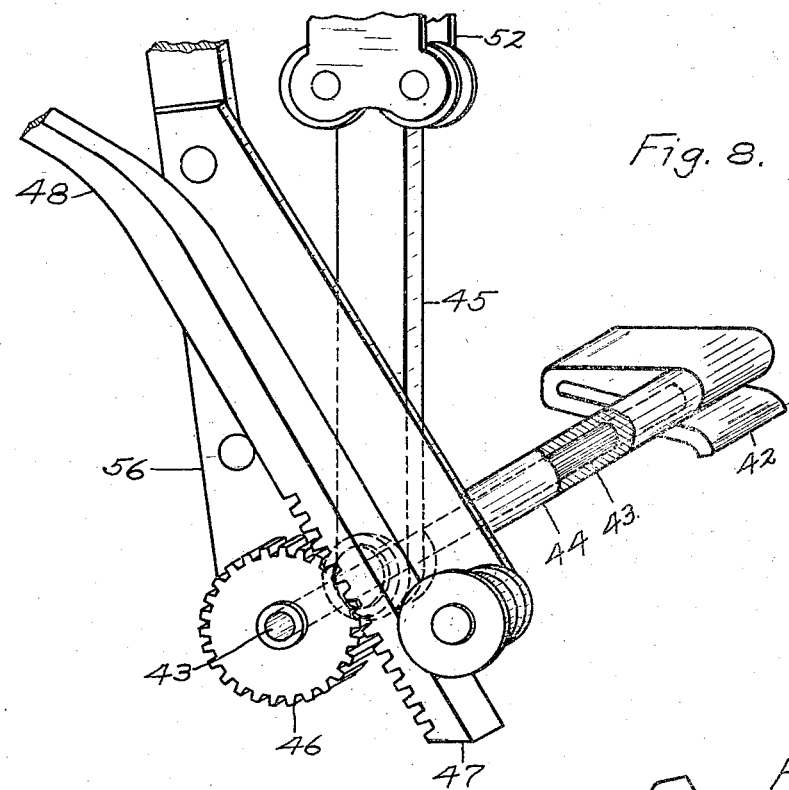
Figure 9:
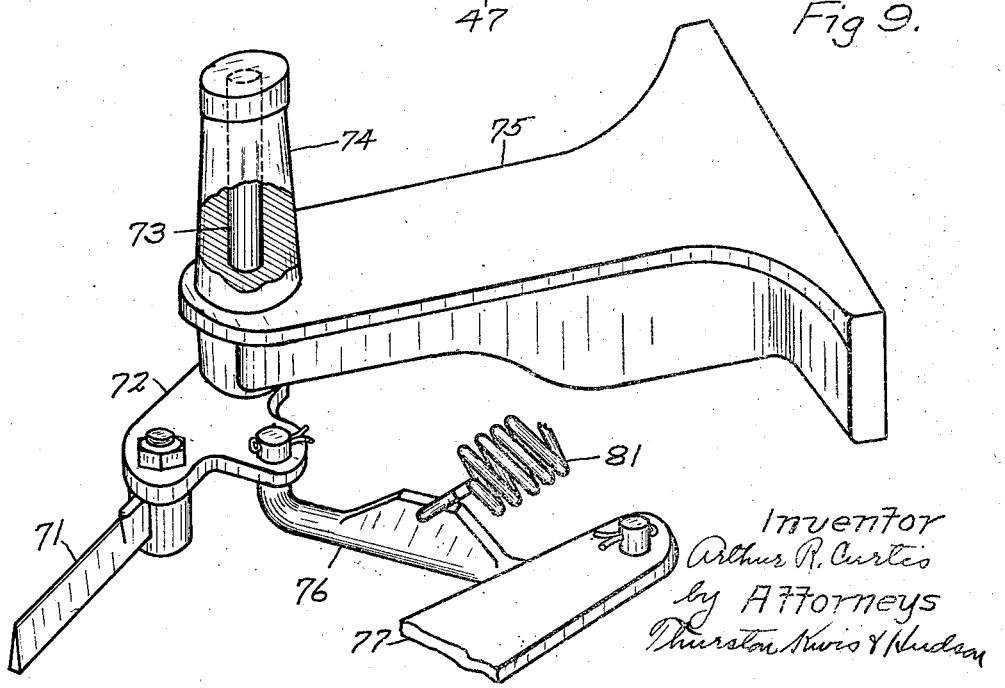
Figure 13:
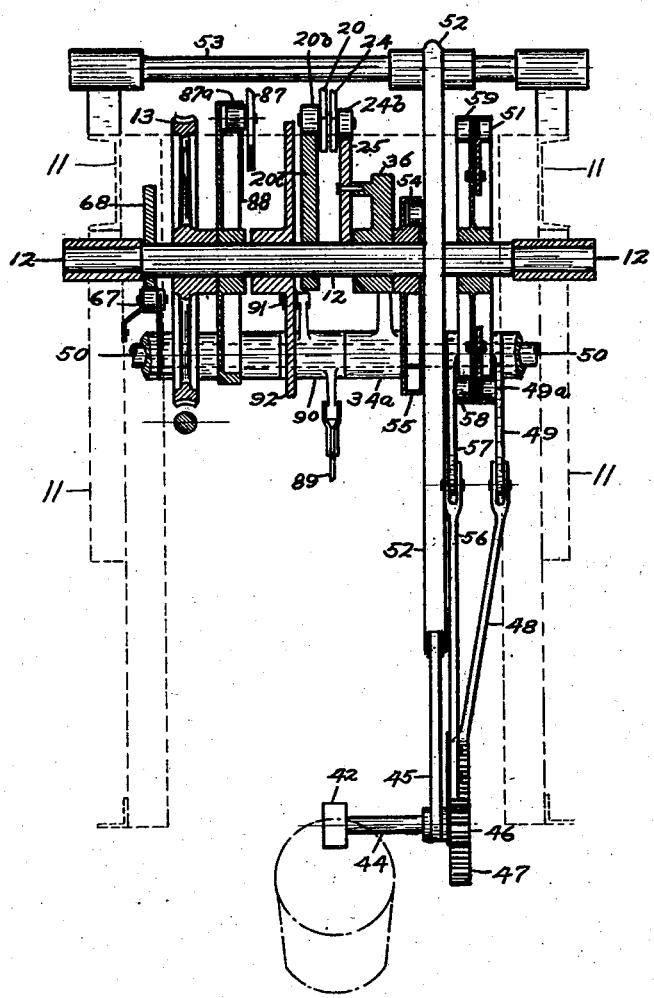

In the accompanying sheets of drawings wherein I have shown an embodiment of my invention which operates very effectively, Fig. 1 is a side elevation of my improved galvanizing or metal coating machine with the pail shown by dotted lines in several positions in its cycle of movement through the machine; Fig. 2 is an end view looking toward the right of Fig. 1; Fig. 3 is an end view looking toward the left of Fig. 1; Fig. 4 is a top plan view; Fig. 5 is a detail view showing a portion of the draining and discharge device on an enlarged scale; Fig. 6 is an enlarged detail view partly in side elevation and partly in section showing particularly the submerger, the flux box, a portion of the transfer device and the skimmer; Fig. 7 is a detail view showing a portion of the transfer device and the single adjustment that need be made to adapt the machine for pails of different sizes; Fig. 8 is a perspective view of the lower portion of the drawing device on an enlarged scale; Fig. 9 is a detail of the striker for striking from the draining edge of the pail the drip material, the same being shown on an enlarged scale; Fig. 10 is a side view of a portion of the machine with the frame removed and showing fragments of the different cams and of the driving gear on the cam shaft, which cams impart motion to the several important elements of the machine; Fig. 11 is a sectional view substantially along the line 11—11 of Fig. 10, looking in the direction indicated by the arrows but omitting all parts beyond a rocker shaft; Fig. 12 is a view similar to the end view of Fig. 2, but omitting the frame, this view being on an enlarged scale and showing certain of the parts in section; Fig. 13 is a view partly in section and partly in elevation of a portion of the machine, the section being taken along the line 13—13 of Fig. 10 or through the cam shaft and showing the drawing mechanism in elevation in front of the cam shaft; Fig. 14 is a diagrammatic view showing a number of positions that the pail assumes in its passage through the machine, and showing the irregular movement which is imparted to part of the drawing device during the drawing and draining of the pail; and Fig. 15 is a similar view showing many positions of the pail during the drawing operation.

Referring now to the drawings, 10 represents the melting pot or receptacle which contains the molten metal, the level of which is indicated at $10^a$. Above this pot is supported the machine proper involving my improvements, which machine includes a substantially rectangular frame 11, which is preferably formed chiefly of structural material and which supports all the working parts. Near the top and slightly to the rear of the center of the frame there is journaled a transverse shaft 12 which is provided with a series of cams, to be referred to presently, for operating the various parts of the machine. This shaft may be rotated in any suitable manner, but in this instance it is driven through worm and worm wheel gearing, designated as a whole by the reference character 13, from a shaft 14 which likewise can be rotated in any suitable manner but for convenience is shown provided with a driving pulley $14^a$.

At the lower front part of the frame there is supported the flux box 15, shown in elevation in several of the views, and in section in Fig. 6, it being understood that this receptacle which is open at the top and bottom extends down into the molten metal and contains the flux which floats on the surface of the metal and through which the pails are passed by the submerger.

The submerger which involves important features of my invention, pushes and directs the pail down through the flux into the molten metal and delivers it to the transfer device. In doing this certain important principles and results are followed or attained, to-wit: the lower edge of the pail is pushed into the metal first. The pail is then gradually tipped so as to elevate the open end to allow the flux to flow out of the inside of the pail and over the top or upper side of the pail in a proper manner, after which the pail is again tipped so that it will land or seat properly in the transfer device. In doing this, the pail engaging devices of the submerger touch the pail only on the upper and lower rims and extend over the surface of the pail as little as possible so as to offer no resistance to the flow of the flux over and around the pail as the latter passes through the same.

The submerger which accomplishes these results is constructed and operated as follows: It includes two sets of push bars which push the pail downward, the latter being held up against the push bars by the reaction of the molten metal. These consist of a pair of main push bars 16 which are adapted to engage the top rim of the pail, and a pair of auxiliary push bars $16^a$ which are adapted to engage the bottom rim of the pail. The main push bars 16 are at their upper ends secured to a slide 17 which is guided for vertical movement by a pair of guides 18, the slide 17 being in this instance slotted at its opposite upright edges and receiving the guides 18 which are in this case in the form of flat strips, best shown in Figs. 2 and 12, and suitably supported from the front end of the frame 11 as shown in Fig. 4. The slide 17 is connected by links 19 to a lever 20 which extends rearwardly over the cam shaft 12, its rear end being secured to a hub $20^a$ which is rotatably or rockingly supported on a cross shaft 21 fixed in the upper rear part of the machine. This lever 20 has a roller $20^b$ (see Figs. 4, 10 and 13) which rides on a cam $20^c$ secured to the cam shaft 12, this cam serving therefore to control the lever 20 and therefore the slide 17.

The auxiliary push bars $16^a$ at their upper ends are secured to slide bars 22 which slide in the slide 17 (see particularly Figs. 2, 6 and 12). These slide bars 22 have secured to them a cross piece $22^a$ which is connected by links 23 to a lever 24 which is pivoted at $24^a$ (see Figs. 1 and 4) to the lever 20. This lever 24 is provided at its rear end with a roller $24^b$ which rides upon a second cam 25 secured to the cam shaft 12, as shown in Figs. 4 and 13. The slide bars 22 which carry the auxiliary push bars $16^a$, are pulled yieldingly upward so that shoulders on the slide bars engage the bottom of the slide 17, by means of springs 26 which at their upper ends are connected to the extreme forward end of the lever 20.

Thus it will be seen that the push bars are controlled independently, and, in fact, they are controlled by the cams $20^c$ and 25 so as to move in unison and relatively in order to push the pail downward and to tip it as desired and as indicated in Fig. 14, which will be referred to presently.

In order that the pail will follow the movement of these bars under all conditions a yielding front guide in the form of a pair of bars 27 is provided for engagement with the top rim of the pail. These bars are pivoted at $27^a$ on the upper part of the flux box, and at their upper ends they are provided with a weight $27^b$ which normally holds the bars in the position shown in Figs. 1 and 6, i. e. in upright position, but permits the bars to yield under abnormal pressure. The lower portions of these bars are bent or recede rearwardly, i. e. toward the discharge end of the machine so that the pail will be tipped upwardly after the lower part thereof enters the molten metal. In fact, the contour of these bars is such that the top edge of the pail remains in contact with the same until just before the pail seats itself in the transfer device. The yielding mounting for the bars or front guide insures that the pail will not be jammed or injured in any way should it stick or perchance get badly out of place. It is to be understood that the pail is tipped as it is moved downward by the push bars, the guide referred to and the one next to be described simply facilitating the tipping motion and co-operating with the push bars in order that the right tipping action is obtained.

Additionally a rear guide consisting of a pair of yielding bars 28 is provided for the pail, this coming into action after a portion of the pail has been pressed down below the surface of the metal. The bars forming the rear guide 28 are pivoted at 28ᵃ onto the front end of the flux box and they are held yieldingly in upward position by a weight 28ᵇ. In the downward movement of the pail the back rim thereof comes in contact with the rear guide 28, before the pail is completely submerged as above stated, and by the reaction from the weight 28ᵇ they hold the rear end of the pail up against the push bars until the pail is seated in the transfer device.

To prevent these bars 28 from interfering with the pail after it has reached the transfer device, an extension 28ᶜ is provided on the carrier for the bars 28, and the end of this extension is engaged by a roller 29 on the slide 17 (see particularly Fig. 6), just before the slide reaches its lowermost position, thus pushing the guide bars 28 out of engagement with the pail. The extension 28ᶜ is normally held by the weight 28ᵇ against a stop 28ᵈ carried by the frame as shown by dotted lines in Fig. 6.

As before stated, the auxiliary lever 24 is fulcrumed on the main lever 20, the springs 26 holding the auxiliary push bars 16ᵃ and slide bars 22 in upper position. All the push bars are moved downward by gravity while engaged in pushing the pail downward through the metal and tipping it with the co-operation of the front guide bars 27 and rear guide bars 28, these push bars and the parts supporting them being operated positively on their upward movement only. This insures that no injury will result to any part of the machine if the operator fails to properly place the pail in position to be engaged by the push bars.

In Fig. 14 I have shown at A the position of the floating pail after the operator has placed the same in the flux box for engagement with the push bars. At B I have shown the position of the pail at the end of the submerging operation or at the instant that the pail seats in the transfer device. Between the positions A and B I have shown the pail in thirteen different positions which clearly show the movements which are imparted to the pail in successive time intervals of equal lengths. It will be seen that the pail is first pushed downward so that the lower front edge of the pail first passes through the flux and enters the metal. In the next lower position the pail is shown as having been tipped slightly, and while passing through several of the next succeeding positions shown this tipping is continued along with the downward movement, the rear end of the pail being lowered more rapidly than the front end so as tip the pail upwardly and allow the flux to flow out from the interior of the pail. It will be seen also that beginning just before the pail is entirely submerged and during the remainder of the movement the pail is tipped in the reverse direction, i. e. toward the horizontal position again, this being accomplished by moving the front end of the pail downward more rapidly than the rear end. In fact, when the entire pail is submerged the movement is largely a swinging movement, and finally when the pail reaches position B in the transfer device, it is in horizontal position or substantially so as in position A, being now not only below position A but somewhat forwardly thereof.

Each pail, of course, is given this same movement from the time that it is engaged by the push bars of the submerger until it reaches the transfer device, this movement being obtained through the control of the cams 20ᶜ and 25 on cam shaft 12 which cause the push bars to be moved at times simultaneously, or at the same or substantially the same speed, and at other times relatively, the auxiliary push bars 16ᵃ moving ahead or faster than the main push bars 16 to tilt or tip the pail upward while it is being submerged. and the main push bars 16 moving faster than the rear push bars during the later movements while the pail is being restored again to horizontal position. It is understood, of course, that the front and rear guide bars 27 and 28 co-operate with the push bars to obtain this result.

I might add at this point that the tipping motion first in one direction and then in the other which is imparted to the pail by the submerger is very important to the attainment of good results in obtaining pails completely galvanized, free of bare spots which heretofore frequently occurred. It is very important also not only that the pail have predetermined rectilinear and angular or tipping motions, but also that these motions be controlled throughout the submerging portion of the cycle. In other words, it is important that the pail have predetermined rectilinear and angular motions imparted at predetermined rates.

The transfer device receives the pail from the submerger, as explained above, and then swings the pail out from under the flux box and carries or draws the upper side of the pail out of the metal and directs the upper front edge of the pail into the fork of the drawing device, the pail being held in the cradle during this movement by the reaction of the fluid metal. This transfer device consists of the cradle 30 carried by a pair of swinging arms 31 which are fulcrumed or rotatably mounted on shaft 32 which is supported by the frame 11 and extends across the same toward the front end of the machine and behind the slide 17, as clearly shown in Fig. 1. The cradle 30 is adapted to receive pails of different sizes and to support the same centrally of the cradle, the cradle being formed by spaced bars bent to provide forwardly extending spaced supporting arms 30$^a$ upon which the sides of the pails rest and upwardly extending arms 30$^b$ at the rear end which engage the bottoms of the pails. This shaft is rocked by a lever 33 whose upper end is connected to the forward end of links 34 (see Figs. 1, 4 and 10) the rear portions of said links being supported and guided by a lever 34$^a$ loosely mounted on a rocker shaft 50 supported in bearings 50$^a$ of the frame and to be subsequently referred to. The links are provided at their rear ends with a roller 35 which engages the periphery of a cam 36 (see Figs. 4, 10 and 13), mounted on cam shaft 12. The contour of cam 36 is such as to swing the cradle from the lower dotted line position to the full line position, which is the position in which the pail is delivered to the fork of the drawing device. The cradle then swings back by gravity to the dotted line position.

In this transfer device, the only adjustment that is necessary to make in the machine is to take care of different sizes of pails. It will be apparent that the top front edge of all sizes must leave the same point beneath the flux box at the start of the swinging movement of the cradle and arrive at the same point in the fork of the drawing device at the end of the swinging movement. This will be brought about if the whole cradle is moved along the line X at the lower left hand corner of Fig. 1, where two smaller sized pails are shown and designated B' and B$^2$, since, as above explained, the cradle 30 is adapted to support centrally thereof pails of different sizes. To do this the bars 31 are at their upper ends bent at an angle corresponding with the angle which the line X makes with respect to the vertical or with respect to the bars 31 when in their lowermost position. These bent ends, which are shown at 31$^a$ (see particularly Fig. 7) are supported in grooves 37$^a$ provided in the faces of arms 37 integral with hubs 38 secured to the cross shaft 32, the said hubs and their arms 37 constituting the means by which the arms 31 of the cradle are attached to the shaft 32. To provide for convenient adjustment of the cradle to adapt the latter for pails of different sizes, the bent ends 31$^a$ of the cradle arms 31 have secured to them racks 39 which are engaged by pinions 40 mounted on a shaft 40$^a$ (see particularly Fig. 4) said shaft having a squared end as shown in Fig. 7, to which a wrench may be applied. After adjustment the parts are clamped together by a bolt 41 lying in slots 37$^b$ extending lengthwise of the hub arms 37.

As before stated, the cradle brings the top front edge of the pail from the metal and delivers the pail to the receiving member of the drawing device, the latter being at all times above the surface of the metal. The drawing device in an automatic galvanizing machine constitutes one of the vital elements of the machine, and the drawing device which I have provided is one of the principal factors in the success of the machine constituting the subject matter of this application. To obtain the desired results I find it necessary that certain principles be strictly adhered to, to-wit; every point on the vertical mid section of the pail should be drawn through the same or substantially the same point on the surface of the metal; secondly, no part after once coming out of the metal should be submerged again; thirdly, and after the pail is drawn, it must be at a proper dripping angle except for the quick flip which should be given to the pail to throw the excess metal out of the rim around the bottom of the pail. To attain these results the pail receiving and holding member of the drawing device must be susceptible of a turning motion and of vertical and horizontal motions, and these motions must be controlled so that they can be imparted at the same time or independently, or in combinations of any two at the same time and predetermined rates, and this is done in the present machine as will now be described.

The pail receiving member of the drawing device is in the form of a fork 42 which receives the top edge of the pail as it is thrust through the surface of the metal by the transfer device. The fork 42 is carried by a shaft 43 extending through and journaled in a stud 44 (see Figs. 3 and 8) which stud is supported by a slide bar 45 to be referred to presently. At its outer end (adjacent the side of the machine opposite to that shown in Fig. 1) the shaft is provided with a gear 46 (see Figs. 8 and 13) which is engaged by a rack 47, which rack is connected by a bar 48 to a lever 49 (see Figs.

4 and 13) which is fulcrumed on the rocker shaft 50 previously referred to and is provided with a roller 49ª (see right hand side of Figs. 3 and 13) engaging a cam groove on the side of cam 51 carried on cam shaft 12, the lever 49 having a hub 49ª (Fig. 4) mounted on the shaft 50. By the action of this cam 51, transmitted through the lever 49, bar 48 and rack 47 to gear 46, rotary motion is imparted to the fork 42.

To give the horizontal motion to the fork 42, the slide bar 45 which carries the stud 44 is mounted to slide up and down in arm 52 (see Figs. 1, 8 and 10), which arm is pivoted to swing on cross-shaft 53 at the top of the frame and is provided with a roller 54 engaging cam 55 on cam shaft 12, (see particularly Figs. 3 and 13). Thus by the swinging of the arm 52 by the cam 55, the fork may be moved horizontally back and forth.

To give vertical motion to the fork 42, slide 45 is connected by bar 56 to a lever 57, fulcrumed on shaft 50 through hub 57ª (see Fig. 4) and having a roller 58 (see Figs. 3 and 13) engaging cam 59 on cam shaft 12. Thus through the action of cam 59, and therefore through the rocking motion imparted to lever 57 and endwise motion imparted to bar 56, the slide 45 may be moved up and down so as to impart vertical movements to the fork.

Therefore by the described mechanisms, rotary, vertical and horizontal motions can be imparted to the fork 42, and as the motions are imparted by cams they can be given to the fork separately, simultaneously or in combinations as already stated.

To explain the motions imparted to the fork 42 and the movements imparted to the pail while it is being drawn and delivered to the part which next receives it, reference will again be had to Fig. 14. I have already explained that the pail is in position A when acted on by the submerger and in position B when received in the transfer device. C shows the position of the pail when the cradle of the transfer device is in about its mid position when shifting the pail to the fork of the drawing device. D indicates the position of the pail when received in the fork of the drawing device, the upper part of the pail having been drawn through the surface of the metal which is indicated by the dot and dash line 10ª, the same as in Fig. 1. As already stated, it is important that every point on the mid vertical section of the pail pass through the same point in the surface of the metal, which point is designated Y. And as previously stated, it is important while carrying this out that no part of the pail be submerged a second time. To accomplish these results and at the same time to draw the pail so that when it has passed entirely through the surface of the metal it is in the best possible position for draining, the fork 42 is given the following movements: When the pail is in position D, i. e. when delivered to the fork, the axis of the fork, i. e. the axis about which it is turned or rotated is in the position designated $d$. The pail is next moved to position E with a diagonal straight line movement consisting of a combined horizontal and vertical movement bringing the axis of the fork to the position $e$. This brings the top portion of the bottom of the pail to the surface of the metal. Then the fork is turned and at the same time given a combined vertical and horizontal movement until the axis of the fork is at $f$, bringing the pail to position F. The lower part of the bottom pail is now at the surface of the metal. Next the drawing of the pail is completed by turning the fork and giving it a combined vertical and horizontal movement until the axis of the pail is in the position $g$, bringing the pail to position G. In doing this, not only is the fork turned but it is moved upwardly and toward the front of the machine and then downwardly and toward the rear or discharge end of the machine as indicated by the dot and dash line between the points $f$ and $g$. The pail is now completely drawn and is in draining position, the open end being downward but inclined somewhat from the vertical position so that the metal will drain from one point of the large or open end. Then the fork is lifted and moved rearwardly somewhat, bringing the pail to the position H, the axis of the fork now being at $h$. At this point in the cycle the pail is given a quick flip downward to position H' to throw the excess metal out of the rim around the bottom of the pail. The pail is then returned again to the draining position H, this downward flipping movement and return movement being brought about by the rotation of the fork. Then the pail is carried rearwardly and somewhat upwardly to position I, with the pail still maintained in draining position, the axis of the fork traveling in a straight line from $h$ to $i$. Then while still in draining position the pail is moved downwardly and rearwardly slightly to position J where it is received in the forks 60 of the draining, striking and discharge device. When the delivery to the forks 60 occurs, the axis of the fork 42 is at $j$, and from this point the fork 42 travels back to position $d$ which is the position for receiving the next pail.

In drawing the pail it is very important in order to avoid excess thickness of the coated metal, and to obtain uniform thickness, that the pail not only be given predetermined rectilinear and turning movements, but it is equally important that these movements be imparted at predetermined times and at predetermined rates just as in the submerging operation, the rate or speed of movement and the kind of movement varying from time to time in the drawing operation, and being dependent at any particular instant on the portion of the pail that is being drawn. In Fig. 15 I have shown the pail positions E, F and G which appear in Fig. 14, and additionally I have shown a large number of intermediate positions between the positions E and G, these intermediate positions showing the kind of movement and the extent of movement in consecutive time intervals of equal length. In this figure, in showing the intermediate positions referred to, the entire pail is not illustrated, as in the main positions, E, F and G, in order that confusion might be avoided.

I might add that from the time that the pail is in position D where it is received in the fork of the drawing device until the pail is entirely drawn and moved to position H the movement is continuous, it being important that throughout the drawing operation the movement be not stopped at any point. Furthermore, in drawing the pail not only are the main principles previously outlined, adhered to, i. e. drawing the pail so that every point on the vertical mid section will pass through the same point in the surface of the metal and so that no part of the pail will be immersed in the metal a second time, but the drawing is continuous as just stated, and the pail is drawn so as to create the least possible disturbance at the surface, the creating of waves or ripples being avoided so as to eliminate the liability of the inner or outer surface of the pail being left with marks or lines as would be the case if waves were created causing the metal to wash up against any part of the surface already drawn through the metal.

I have already stated that both in the submerging operation and in the drawing operation the pail is given predetermined rectilinear and turning movements at predetermined rates, and the diagrams illustrating the submerging and drawing movements show how the character of movement and the rate of movement vary as the pail is moved during the submerging and drawing operations. Hence these diagrams show that both during the submerging operation and the drawing operation the movement of the pail follows a predetermined law of motion which is illustrated in the two diagrams referred to.

The draining, striking and discharge device receives the pail as just stated, and after holding it until all the metal has drained off that will drain, it strikes off the drip on the lower edge of the pail and then turns the pail over and discharges it down the discharge ways at the rear end of the machine which lead to a receiving platform on which the pail lands with its top up so as to give a smooth finish to the top rim of the pail as the pail is turned over before the metal has completely set on the rim.

The forks 60 of the draining, striking and discharge device are connected by an arm 60ª to a shaft 61 journaled in a support 62 and provided with a pinion 63 engaged by a rack 64 (see Figs. 1, 5 and 10) which rack is connected by a bar 65 to a lever 66 (see Figs. 1 and 10) which lever is pivoted onto a part of the frame 11 and carries a roller 67 adapted to be engaged by a cam 68 (see Figs. 1 and 10) carried by the cam shaft 12. The bar 65 is moved downward by the cam so as to rotate the forks 60 in the clockwise direction as viewed in Figs. 1 and 10 so as to discharge the pail down the ways 69 shown at the right hand side of Figs. 1 and 10, and the bar 65 and rack 64 are moved in the reverse direction so as to return the forks 60 to pail receiving position by a spring 70 connected to the bar and to the frame as clearly shown in Figs. 1 and 10. This mechanism provides the motion for turning the pail over and discharging it. This discharge does not take place immediately after the forks 60 receive the pail, but the pail is allowed to remain in the forks while in position J shown in both Figs. 1 and 14 until all the metal has drained off the pail that will drain, as already stated.

Then before the swinging or discharge motion of the pail begins, the excess metal on the draining edge of the pail is struck off, and to do this I employ a striker blade 71, which moves over that part of the edge of the pail from which the draining took place, with a quick swinging stroke in both directions. This striker blade 71, which is shown in Figs. 1, 9 and 10, is fastened in a holder 72 having a stem 73 adapted to slide up and down and to rotate in an upstanding boss 74 of a bracket 75 secured to the rear end of the frame of the machine. A rod 76 connects the blade holder 72 with a lever 77 (see Figs. 1 and 9) which lever is keyed to a vertical shaft 78 journaled in the frame as shown in Figs. 1 and 10. This shaft carries near its upper end a roller 79 which is adapted to engage a cam 80 attached to the rim of the main drive gear 13, this cam being shown in Figs. 4 and 10. Attached to the rod 76 and to the frame is a spring 81 (see particularly Figs. 1 and 9) which spring is in inclined position so as to exert both a lateral and upward pull on the rod 76, and therefore on the holder 72 and striker blade 71. In other words, when the pail is delivered to the forks 60 and is in position J, the blade is pressed up yieldingly against the lower part of the draining edge of the pail, and at the proper instant at the end of the draining period the cam 80 on the drive gear comes into play for just an instant, and strikes the roller 79 so as to give a quick rocking motion to the shaft 78, causing the blade to be given a quick wiping or striking stroke across the draining edge of the pail, and immediately after the spring causes the blade to have a quick stroke in the reverse direction, the blade during both strokes following around the edge of the pail, i. e. its inclined contour so as to forcibly strike off the metal drip clinging to the edge of the pail.

As soon as this is done the forks are rotated by the action of the cam 68, lever 66, bar 65 and rack 64 so as to deliver the pail onto the ways 69 down which the pail slides, the pail being given a rotary motion through positions K and L to the delivery position M shown in Fig. 1, as well as in Fig. 14. The forks then return to the position shown in Fig. 1 so as to be ready to receive the next pail.

The pails are discharged by the swinging forks 60 down the ways 69 with some velocity, and at the bottom of the ways they strike the corner of a horizontal receiving platform 69ª and by their momentum are turned to upright position against a back rest 69ᵇ as shown in Fig. 10. When the pails land on the receiving platform 69ª, as shown in Fig. 10, the metal has set on the body of the pail but not at the top edge. Due to the fact that the top edge or rim encloses or is wrapped around a wire, there is more metal or greater thickness of the metal at the top rim than elsewhere. This causes the heat to be retained longer at the top rim then elsewhere and in consequence the metal has not set at the top rim. Therefore, when pails land on the receiving platform 69ª, the metal can still flow slightly at the top of the pail and it does this to a sufficient extent to leave the top rims of the pails smooth and thereby eliminates the ragged edge which so frequently appears on the tops of galvanized pails.

Two additional important features of my invention yet remain to be explained, one being the skimmer which travels over and skims the surface of the metal through which the pail is drawn, and the second being a novel adjustment by which the skimmer blade may be caused to dip a uniform depth into the surface of the metal.

It is important that the skimmer on the skimming stroke be moved along a perfectly straight line, with its lower edge just dipping into the metal, and that it be moved in the reverse direction on a level line just above the metal. In the present machine the skimmer is in the form of a flat blade 82 which extends substantially across the pot, and just before the pail is drawn to the surface of the metal the skimmer is caused to travel rearwardly or away from the flux box with a quick stroke just above the surface of the metal and then is lowered into the metal and then is given its skimming stroke by being drawn back toward the flux box over the spot through which the pail is about to emerge from the metal with the edge of the blade just into the metal so as to clean the surface of oxide and any foreign matter which may be on the surface. This blade 82 is attached at its ends to arms 83 fulcrumed on the lower ends of levers which at their upper ends are attached to and swing with shaft 50, already referred to. This shaft 50 carries a lever 85 (see Figs. 1 and 10) connected by links 86 to a lever 87 fulcrumed on shaft 21 and provided with a roller 87ª (see Fig. 4) engaging a cam 88 on cam shaft 12. This cam 88 through lever 87, links 86, arm 85, shaft 50, levers 84 and arms 83 imparts the swinging movement to the skimmer blade 82.

To cause the blade to move along in a straight horizontal line so that its lower edge will be maintained at all times at a given depth in the metal throughout the skimming stroke and to cause the blade to be lifted from the metal for the stroke in the opposite direction, the following movement controlling means is provided. A forked yoke 89 (see Figs. 1, 2, 10 and 12) at its lower end is hooked into the arms 83 carrying the skimmer blade, and at its top is connected to a rocker lever or bell crank 90 provided with an upstanding arm 90ª having a roller 91 (see Figs. 10 and 11) engaging cam 92 on cam shaft 12 (see Figs. 4, 10 and 13), the contour of this cam being such as to constrain the skimmer blade to travel in an exactly level line on the skimming stroke and to be elevated above the surface of the metal and to travel on an exactly level line on the out stroke and then to be lowered into the metal for the skimming stroke.

When the machine is in operation it is obvious that molten metal is gradually consumed or carried away by the pails as they are galvanized. Therefore, in order that the skimmer blade may be maintained at a uniform depth in the metal it is necessary either that fresh metal be added to the pot, or that there be an adjustment between the pot and the blade or the superstructure on the pot. The addition of metal from time to time is not feasible for the reason that it would have to be applied in the form of pigs which would change the temperature of the molten metal and be liable to cause splashing of molten metal which is to be avoided. I accomplish the result by the provision of means whereby the skimmer blade may be lowered whenever desired, and in this case the entire machine is lowered with respect to the pot containing the molten metal. To do this the frame is supported at its four corners by vertical shafts 93, the lower portions of the shafts being threaded. The threaded portions of these shafts are engaged by nuts 94 at the four lower corners of the frame so that the frame and all the mechanism carried by it will be raised or lowered when these shafts are turned. On opposite sides of the frame there are provided a pair of horizontal shafts 95, at least one of which is provided with a hand wheel 96 shown in Figs. 1 and 3, and both shafts are connected together so as to rotate in unison by a sprocket chain 97 and sprocket wheels 98 provided on the two shafts. The horizontal shafts 95 are connected to the vertical shafts 93 by worm and worm wheel gearing 99. Thus the operator has simply to turn the hand wheel 96 from time to time so as to lower the machine toward the pot and thereby maintain the desired constancy in the depth to which the skimmer blade projects into the molten metal.

It will be seen therefore, from the above description, that as the operator inserts the pails, one at a time, beneath the pusher bars, each is pressed down through the flux and into the metal and while being lowered it is tipped first in one direction to elevate the open end of the pail, and then in the reverse direction to deliver the pail properly into the cradle of the transfer device, the front and rear guides co-operating with the push bars to cause the pail to have the right tipping motions as it is lowered. The fact that the push bars are moved downward by gravity and are positively actuated only when moved upward, and the fact that the front and rear guides may yield, eliminate the liability of injury if the pails are improperly handled or placed in the machine by the operator.

It will be understood also that immediately after the pail is delivered into the cradle of the transfer device it is swung upwardly and toward the rear of the machine bringing a small portion of the pail through the metal into the fork of the drawing device which draws the pail so that every part on the vertical mid section of the pail emerges from the metal at the same point in its surface, and that the pail is drawn without any part entering the metal a second time, and when completely drawn is in the right position for draining. Likewise, it will be understood from the above detailed description that the pails are flipped to discharge the metal from within the rim around the bottom and then delivered in draining position to the draining, striking and discharge device which receives the pail, holds it in draining position for the proper length of time, then strikes off the drip metal at the draining edge, and finally turns the pail and delivers it to the discharge ways so as to cause it to land top up on the receiving platform, the operation of the parts being so timed that the landing of the pail on the platform takes place before the metal is completely set at the top edge, and allowing the edge to become smooth before the metal does set as explained above.

It will be understood from the above description also, that though the parts are shaped to accommodate pails, other vessels or articles could be very readily passed through the machine and galvanized by slight changes in the shape of certain of the parts to conform to the shape of such other articles that may be galvanized. It will be understood also that the machine is adapted for galvanizing pails of different sizes simply by the adjustment of the arm 31 of the transfer device.

It will be understood also, that though of necessity the operations have been described in sequence, many movements are taking place at the same time so as a matter of fact the pails are passed through the machine and galvanized at a rapid rate assuming, of course, that they are fed into the machine as fast as the speed thereof permits.

While I have shown simply the preferred construction which has been found by extensive tests to be very satisfactory, I do not desire to be confined to the exact details shown, but aim in my claims to cover all modifications which do not involve a departure from the spirit and scope of my invention as defined in the appended claims.

Having described my invention, I claim:

1. A metal coating machine, a receptacle for fluid metal, a submerger by which the articles are lowered into the fluid metal, said submerger having independently movable, pushing members engageable with the articles and each capable of exerting a downward thrust on an article.

2. In a metal coating machine, a receptacle for fluid metal, a submerger including separate downwardly movable pushing members engageable with an article to push the same into the metal, and means for moving said devices relatively whereby the article may be tipped while being lowered.

3. In a metal coating machine, a receptacle for fluid metal, and a submerger for submerging an article into the fluid metal, said submerger having means for tipping the article first in one direction and then in another during the downward movement of the article.

4. In a metal coating machine, a receptacle for fluid metal, and a submerger for lowering an article into the fluid metal comprising devices for engaging the article on the top and bottom edges or rims thereof only.

5. In a coating machine, a receptacle for fluid material, a submerger for lowering an article into the fluid material comprising two pushing devices for engaging definite portions of the article, and means for lowering said devices and moving them relatively whereby the article may be tipped while being lowered.

6. In a coating machine, a receptacle for fluid material, a submerger for lowering articles into the fluid material, said submerger including means for engaging the article so as to push it into the material, and means for positively actuating said means while the latter is moved in an upward direction only.

7. In a coating machine, a receptacle for fluid material, a submerger for submerging an article into the fluid material, said submerger including devices for engaging the upper part of an article and for pushing it downward into the material, and means for actuating said devices so that in submerging they are non-positively actuated and are positively actuated on the return stroke.

8. In a coating machine, a receptacle for fluid material, a submerger for submerging an article into the fluid material, said submerger including a member for pushing the article into the material, and a guide cooperating therewith to control the path of movement of the article.

9. In a coating machine, a receptacle for fluid material, a submerger for causing an article to be lowered into the fluid material, said submerger comprising a device for pushing the article downward into the material, and a yieldable guide adapted to be engaged by the article while being submerged and cooperating with said lowering device so as to control the path of movement of the article.

10. In a metal coating machine, a receptacle for fluid metal, and a submerger for lowering an article into the fluid metal, said submerger including means for engaging the article to push it downward, and a pair of guides adapted to be engaged by the article while being submerged.

11. In a metal coating machine, a receptacle for fluid metal, and a submerger for lowering an article into fluid metal, said submerger including means for engaging the article to push it downward, and a pair of guides adapted to be engaged by the article while being submerged, said guides being yieldably supported.

12. In a metal coating machine, a receptacle for fluid metal, and a submerger for submerging articles into the fluid metal, said submerger comprising devices for engaging opposite end portions of the article so as to push the article into the metal, and guide means co-operating therewith to control the path of movement of the article while being submerged.

13. In a metal coating machine, a receptacle for fluid metal, a submerger for submerging articles into the fluid metal including means for engaging the upper portion of the article so as to push the article into the fluid metal, and a pair of guides adapted to be engaged by opposite ends of the article while being submerged.

14. In a metal coating machine, a receptacle for fluid metal, a submerger for submerging articles into the fluid metal including means for engaging the upper portion of the article so as to push the article into the fluid metal, a guide adapted to be engaged by the article while being submerged, and means for moving said guide out of engagement with the article.

15. In a metal coating machine, a receptacle for fluid metal, and a submerger for lowering articles into the fluid metal comprising means for engaging the upper portion of and for pushing the article downward, and guide means co-operating therewith, both the pushing means and the guiding means being yieldable during the submerging operation.

16. In a metal coating machine, a receptacle for fluid metal, and a submerger for lowering an article into the fluid metal including means for causing one end of the article to be moved faster than the opposite end during a portion of the submerging movement.

17. In a metal coating machine, a receptacle for fluid metal, and a submerger for lowering an article into the fluid metal and including means for causing one end of the article to be moved faster than the opposite end during a portion of the submerging movement, and for causing said opposite end to be moved faster than the first named end during another portion of the submerging movement.

18. In a metal coating machine, a receptacle for fluid metal, and a submerger for lowering an article into the fluid metal, said submerger having means for imparting different predetermined rectilinear and angular movements to the article at predetermined times and at predetermined rates between the beginning and end of the submerging movement.

19. In a metal coating machine, a receptacle for fluid metal, a submerger for causing an article to be lowered into the fluid metal, a device for drawing the article from the metal, and an article engaging member for shifting the article through the metal from the submerger to the drawing device and serving to draw a portion of the article through the surface of the metal.

20. In a metal coating machine, a receptacle for fluid metal, a submerger for lowering an article into the fluid metal, a device operating wholly above the surface of the fluid metal for drawing the article from the metal and a movable transfer member for moving the article from the submerger to the drawing device.

21. In a metal coating machine, a receptacle for fluid metal, a submerger for the article to be coated, a drawing device for lifting the submerged articles from the fluid material, and an article supporting member for carrying the articles from the submerger to the drawing device and serving in its movement to cause a portion of the article to be projected through the surface of fluid metal.

22. In a metal coating machine, a receptacle adapted to contain fluid metal, a submerger for lowering articles into the fluid metal, a drawing device for drawing them from the metal, and a transfer device for transferring the article from the submerger to the drawing device and mounted to swing through an arc.

23. In a metal coating machine, a receptacle adapted to contain fluid metal, a submerger for lowering articles into the fluid metal, a cradle for receiving an article, and means for swinging the cradle so as to retain the article therein by the re-action of the metal through which the article is moved.

24. A metal coating machine having a receptacle for fluid metal, a submerger, a drawing device and a transfer device for moving articles to the drawing device having an adjustment by which said elements are adapted for articles of different sizes.

25. In a metal coating machine, a receptacle for fluid metal, a submerger for lowering articles into the metal, a drawing device for drawing the articles from the metal, and a transfer device for transferring the articles from the submerger to the drawing device, said transfer device having an article receiving portion adjustable bodily to adapt it for articles of different sizes.

26. In a metal coating machine, a receptacle for fluid metal, a submerger for lowering articles into the metal, a drawing device for drawing the articles from the metal, and a transfer device for transferring the articles from the submerger to the drawing device, said transfer device having adjustable members by which the article receiving portion of the transfer device may be shifted so as to position a given part of different sized articles similarly with respect to other parts of the machine.

27. In a metal coating machine, a receptacle for fluid metal, a submerger for lowering articles into the metal, a drawing device for drawing the articles from the metal, and a transfer device for transferring the articles from the submerger to the drawing device, said transfer device including an article receiving portion and one or more swinging arms for supporting it.

28. In a metal coating machine, a receptacle for fluid metal, a submerger for lowering articles into the metal, a drawing device for drawing the articles from the metal, and a transfer device for transferring the articles from the submerger to the drawing device, said transfer device including an article receiving portion and one or more adjustable swinging arms for supporting it.

29. In a metal coating machine, a receptacle for fluid metal into which articles are adapted to be lowered, and means for drawing the articles from the fluid metal and imparting to the articles rotary, vertical and horizontal movements while they are being drawn from the metal.

30. In a metal coating machine, a receptacle for fluid metal into which articles are adapted to be submerged, and a device operating wholly above the surface of the metal for drawing the articles from the fluid metal and means for moving the submerged article partly through the surface of the metal to said device.

31. In a metal coating machine, a receptacle adapted to contain fluid metal and to receive articles to be coated, and a drawing device for drawing articles from the metal, and means for actuating said device so that points on the article lying in a given plane of the article pass through substantially the same point in the surface of the metal.

32. In a metal coating machine, a receptacle adapted to contain fluid metal and to receive articles to be coated, and a drawing device for drawing the articles from the metal, and means for actuating said device so that every point in the mid-vertical section of an article passes through substantially the same point in the surface of the metal.

33. In a metal coating machine, a receptacle adapted to contain fluid metal and to receive articles to be coated, a drawing device for drawing articles from the metal, and means for actuating said device so that every point in the mid-vertical section of the article passes through substantially the same point in the surface of the metal without any part of the article being submerged a second time.

34. In a metal coating machine, a receptacle adapted to contain fluid metal in which articles are adapted to be immersed, means for drawing the articles from the fluid metal including a device for engaging or gripping the article, and means for actuating said device so as to cause it to draw an article from the metal and to move it when wholly out of the metal to a draining position with the bottom thereof uppermost and for then actuating said device to cause said device to give the article a quick turn to throw the bottom of the article to substantially a vertical position so as to discharge excess material that may be lodged on the bottom of the article.

35. In the metal coating machine, a receptacle adapted to contain fluid metal, in which articles are adapted to be immersed, a device for drawing the articles from the fluid metal including a part adapted to engage an article at the open end thereof, and means for actuating said device so that the article is drawn from the fluid metal and when out of the metal is moved to a draining position with the open end down, and for then actuating said device to give the article a quick turn in one direction to throw the bottom thereof to a substantially vertical position and for then with a sudden reversal of movement restoring the article to draining position.

36. In a metal coating machine, a receptacle for fluid metal into which articles are adapted to be immersed, means for submerging the articles in the metal, drawing means for drawing the articles from the fluid metal, and including a member for engaging and gripping an article, a device for receiving the article from the drawing member and for delivering it from the machine, and means for actuating the drawing member so as to cause the article to be moved to said device and to hold the article at a fixed angle with respect to the horizontal during such movement.

37. In a metal coating machine, a receptacle for fluid metal into which articles are adapted to be immersed, drawing means for drawing the articles from the fluid metal including a member for engaging and gripping an article, a device for receiving the article from the drawing member and for delivering it from the machine, and means for actuating the drawing member so as to cause it to draw the article from the fluid metal with the article in draining position, then to give it a quick turning movement in one direction and then back again to draining position for causing it to deliver the article while in draining position to said device.

38. In a metal coating machine, a receptacle for fluid metal into which articles are adapted to be lowered, a drawing device for drawing the articles from the metal, and means for imparting to said device vertical, horizontal and turning movements, each of said movements being at predetermined rates varying at different parts of the drawing movement.

39. In a metal coating machine, a receptacle adapted to contain fluid metal in which articles to be coated are adapted to be immersed, means for drawing the articles from the metal and for delivering the drawn articles, and a movable member adapted to be moved across the draining edge of an article while in the draining position.

40. In a metal coating machine, a receptacle adapted to contain fluid metal in which articles to be coated are adapted to be immersed, a drawing device for drawing the articles from the metal, means for delivering immersed articles thereto, a skimmer adapted to clean the surface of the metal through which articles are drawn, a support for the skimmer mounted to swing about a horizontal axis for giving the skimmer its cleaning stroke, and separate means for controlling the depth to which the skimmer is immersed in the metal during its stroke.

41. In a metal coating machine, a receptacle adapted to contain fluid metal in which articles to be coated are adapted to be immersed, mechanism for causing the articles to be immersed and drawn from the metal and for causing the surface of the metal to be skimmed, and means whereby the receptacle and said mechanism may be adjusted one relative to the other.

42. In a metal coating machine, a receptacle adapted to contain fluid metal in which articles are adapted to be immersed, a device for drawing the article from the metal, a support adapted to receive the coated articles and hold the same in draining position, means for striking excess metal from the draining edge of the article, and a device for delivering the articles to said support in upright position before the metal has set at the top edge thereof.

43. In a metal coating machine, a receptacle adapted to contain fluid metal in which articles to be coated are adapted to be immersed, means for draining the articles from the metal and for supporting the same in draining position, and means for removing excess metal from the drainage edge of the article comprising a striker and means for rapidly moving the striker across the drainage edge of the article.

44. In a metal coating machine, a receptacle adapted to contain fluid metal in which articles to be coated are adapted to be immersed, means for draining the articles from the metal and for supporting the same in draining position, and means for removing excess metal from the drainage edge of the article comprising a striker blade and means for moving the blade across the drainage edge of the article with a rapid forward and return movement.

45. In a metal coating machine, a receptacle adapted to contain fluid metal in which articles to be coated are adapted to be immersed, means for draining the articles from the metal and for supporting the same in draining position, a striker for removing excess metal from the drainage edge of the article, a support adapted to receive the articles, means for delivering the articles to the support with the drainage edge uppermost, and means for actuating said striker and said delivering means in rapid succession.

In testimony whereof, I hereunto affix my signature.

ARTHUR R. CURTIS.